United States Patent
Dymond et al.

(10) Patent No.: US 9,624,941 B2
(45) Date of Patent: Apr. 18, 2017

(54) ROTOR FOR A TURBOMACHINE

(75) Inventors: Nigel Youatt Dymond, Malmesbury (GB); David Ions, Malmesbury (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 13/367,765

(22) Filed: Feb. 7, 2012

(65) Prior Publication Data

US 2012/0201682 A1    Aug. 9, 2012

(30) Foreign Application Priority Data

Feb. 8, 2011   (GB) .................................. 1102132.6

(51) Int. Cl.
| | |
|---|---|
| *F04D 29/02* | (2006.01) |
| *F04D 29/20* | (2006.01) |
| *F04D 29/26* | (2006.01) |
| *F04D 29/28* | (2006.01) |

(52) U.S. Cl.
CPC ............. *F04D 29/20* (2013.01); *F04D 29/02* (2013.01); *F04D 29/026* (2013.01); *F04D 29/263* (2013.01); *F04D 29/28* (2013.01); *F05D 2300/43* (2013.01); *Y10T 29/49316* (2015.01); *Y10T 29/49321* (2015.01)

(58) Field of Classification Search
CPC ........ F04D 29/02; F04D 29/026; F04D 29/20; F04D 29/263; Y10T 29/49321
USPC ......... 416/204 R, 205, 213 A, 213 R, 244 A, 416/244 R
See application file for complete search history.

(56) References Cited

U.S. PATENT DOCUMENTS

| | | | |
|---|---|---|---|
| 3,565,553 A | | 2/1971 | Rinehart et al. |
| 3,709,633 A | | 1/1973 | Wooden |
| 3,884,595 A | * | 5/1975 | Herrick ..................... 416/198 R |
| 4,427,911 A | * | 1/1984 | Manson .................. 310/156.21 |
| 4,483,660 A | | 11/1984 | Roberts |
| 5,221,184 A | | 6/1993 | Gesenhues et al. |
| 5,421,781 A | | 6/1995 | Mackellar |
| 5,632,685 A | | 5/1997 | Myers |
| 6,039,536 A | | 3/2000 | Van De Venne et al. |
| 6,534,889 B2 | * | 3/2003 | Katagiri ................... H02K 1/30 310/67 R |
| 6,700,256 B2 | * | 3/2004 | Fukutani ............ G11B 19/2009 310/67 R |

(Continued)

FOREIGN PATENT DOCUMENTS

| | | |
|---|---|---|
| DE | 10 2004 031 852 | 1/2006 |
| EP | 0 564 194 | 10/1993 |

(Continued)

OTHER PUBLICATIONS

Search Report and Written Opinion mailed Apr. 27, 2012 directed to International Patent Application No. PCT/GB2012/050140; 11 pages.

(Continued)

*Primary Examiner* — Gregory Anderson
*Assistant Examiner* — Christopher R Legendre
(74) *Attorney, Agent, or Firm* — Morrison & Foerster LLP

(57) ABSTRACT

A rotor that includes an impeller secured to a shaft. The impeller has a bore and a counterbore. The shaft forms an interference fit with the bore and is adhered to the counterbore. A method of manufacturing the rotor is also described.

13 Claims, 3 Drawing Sheets

(56) References Cited

U.S. PATENT DOCUMENTS

| | | | | |
|---|---|---|---|---|
| 7,913,269 | B2* | 3/2011 | Takaki | G11B 17/0282 |
| | | | | 310/261.1 |
| 8,450,897 | B2* | 5/2013 | Yoneyama | 310/156.21 |
| 8,593,756 | B2* | 11/2013 | Sugi | G11B 19/2009 |
| | | | | 310/90 |
| 8,638,526 | B2* | 1/2014 | Shinji | G11B 25/043 |
| | | | | 310/90 |
| 8,756,794 | B2* | 6/2014 | Ions | H02K 1/2733 |
| | | | | 29/598 |
| 2002/0084704 | A1 | 7/2002 | Fukutani et al. | |
| 2003/0168064 | A1 | 9/2003 | Daly et al. | |
| 2005/0239558 | A1 | 10/2005 | Brandt et al. | |
| 2008/0011266 | A1* | 1/2008 | Staudenmaier et al. | 123/198 R |
| 2008/0199319 | A1 | 8/2008 | Mause et al. | |
| 2009/0001826 | A1 | 1/2009 | Suzuki et al. | |
| 2009/0245707 | A1 | 10/2009 | Schmidt et al. | |
| 2010/0181875 | A1* | 7/2010 | Tamaoka | G11B 19/2009 |
| | | | | 310/425 |
| 2010/0215485 | A1* | 8/2010 | Childe et al. | 415/203 |
| 2010/0215491 | A1* | 8/2010 | Mockridge et al. | 415/229 |
| 2011/0033282 | A1 | 2/2011 | Streich | |
| 2011/0044810 | A1* | 2/2011 | Ions | 415/229 |
| 2012/0014806 | A1 | 1/2012 | Mockridge | |
| 2012/0049662 | A1* | 3/2012 | Ions | 310/43 |
| 2012/0092792 | A1* | 4/2012 | Sugi | G11B 19/2009 |
| | | | | 360/97.12 |
| 2012/0201682 | A1* | 8/2012 | Dymond et al. | 416/204 R |
| 2013/0052019 | A1* | 2/2013 | Ions et al. | 416/174 |
| 2013/0223997 | A1* | 8/2013 | Childe et al. | 415/170.1 |

FOREIGN PATENT DOCUMENTS

| | | |
|---|---|---|
| EP | 0 905 382 | 3/1999 |
| GB | 775807 | 5/1957 |
| GB | 2 113 016 | 7/1983 |
| GB | 2467967 | 8/2010 |
| GB | 2467969 | 8/2010 |
| JP | 61-190580 | 8/1986 |
| JP | 2-7841 | 1/1990 |
| JP | 2-184236 | 7/1990 |
| JP | 7-59294 | 3/1995 |
| JP | 8-319993 | 12/1996 |
| JP | 2003-328984 | 11/2003 |
| JP | 2006-353100 | 12/2006 |
| JP | 2007-255420 | 10/2007 |
| JP | 2008-160959 | 7/2008 |
| JP | 2010-196705 | 9/2010 |
| WO | WO-90/10816 | 9/1990 |
| WO | WO-2010/097610 | 9/2010 |

OTHER PUBLICATIONS

GB Search Report dated Apr. 28, 2011, directed towards GB Patent Application No. 1102132.6; 1 page.

Mockridge, I., U.S. Office Action mailed Mar. 10, 2014, directed to U.S. Appl. No. 13/203,155; 17 pages.

Mockridge, U.S. Office Action mailed Nov. 6, 2014, directed to U.S. Appl. No. 13/203,155; 13 pages.

Mockridge, U.S. Office Action mailed Jun. 5, 2015, directed to U.S. Appl. No. 13/203,155; 14 pages.

* cited by examiner (a)

(b)

(c)

(d)

ROTOR FOR A TURBOMACHINE

REFERENCE TO RELATED APPLICATIONS

This application claims the priority of United Kingdom Application No. 1102132.6, filed Feb. 8, 2011, the entire contents of which are incorporated herein by reference.

FIELD OF THE INVENTION

The present invention relates to a rotor for a turbomachine.

BACKGROUND OF THE INVENTION

The rotor of a turbomachine typically comprises an impeller secured to a shaft. The impeller may be secured to the shaft by interference fit, which provides a cost-effective means of securement. As the rotor rotates, radial stresses cause the bore of the impeller to expand. As a result, the interference fit between the impeller and shaft decreases. At relatively high speeds, the expansion of the bore may be such that the interference fit is no longer able to transmit the required torque between the shaft and the impeller. In order to avoid this situation, the interference fit between the impeller and the shaft, when stationary, may be increased. However, the required interference fit needed to ensure torque transmission over the full operating speed range of the rotor may exceed the yield point of the impeller. Additionally, the press force required to achieve the required interference fit may be excessive.

SUMMARY OF THE INVENTION

In a first aspect, the present invention provides a rotor comprising an impeller secured to a shaft, wherein the impeller comprises a bore and a counterbore, the shaft forms an interference fit with the bore, and the shaft is adhered to the counterbore.

By employing a part interference fit and part adhesive join to secure the impeller to the shaft, torque transmission between the impeller and the shaft may be achieved without the need for an interference fit that exceeds the yield point of the impeller or requires an excessive press force. In particular, the adhesive between the shaft and the counterbore may be of sufficient strength to ensure that the required torque is transmitted between the impeller and the shaft. The interference fit may then be employed primarily to maintain alignment between the impeller and the shaft. Since the interference fit is employed primarily for alignment rather than torque transmission, an interference fit may be employed that does not require an excessive press force and does not exceed the yield point of the impeller.

The impeller may comprise a hub, a plurality of blades provided on the hub, and a boss that extends axially from the hub. The bore may then be formed in the hub and the counterbore may be formed in the boss. As the rotor rotates, the impeller is stressed radially, which causes the diameters of the bore and the counterbore to expand. The majority of the mass of the impeller typically resides in the hub and blades. As a result, radial expansion will be greatest at the hub. In contrast, the boss is typically lighter and is therefore subject to less radial expansion. By locating the counterbore in the boss, excessive peel stress of the adhesive may be avoided.

The bore may extend from the hub into the boss. Since expansion of the boss is typically smaller than that of the hub, the portion of the bore that extends into the boss may be used to ensure an interference fit over all operating conditions of the rotor. Conceivably, the counterbore may extend from the boss into the hub. However, since radial expansion is likely to be greatest at the hub, the resulting peel stress may result in failure of the adhesive.

The hub may comprise a recess into which the boss extends. As a result, the impeller is axially compact. More particularly, the boss may be wholly contained within the recess such that the boss is bound within the profile of the hub. The hub may comprise an upper surface on which the blades are provided, and a lower surface that is shaped so as to define the recess.

The impeller may be formed of plastic, which has the advantages of weight and cost over many other materials. Being formed of plastic, the yield point of the impeller may be relatively low. By employing a part interference fit and part adhesive join, torque transmission between the impeller and the shaft may be achieved without the need for an interference fit that would otherwise exceed the yield point of the impeller.

In a second aspect, the present invention provides a rotor comprising an impeller secured to a shaft, the impeller comprising a hub, a plurality of blades provided on the hub, and a boss that extends axially from the hub, wherein the hub comprises a bore, the boss comprises a counterbore, the shaft forms an interference fit with the bore, the shaft forms a clearance fit with the counterbore, and an adhesive is located in the clearance between the shaft and the counterbore.

In a third aspect, the present invention provides a method of manufacturing a rotor, the method comprising: providing an impeller having a bore and a counterbore; inserting a shaft into the bore, the shaft forming an interference fit with the bore; introducing an adhesive into the counterbore; inserting the shaft into the counterbore such that adhesive is drawn into a clearance formed between the shaft and the counterbore; and curing the adhesive.

As the shaft is inserted into the counterbore, the interference fit between the shaft and the bore creates a seal that actively draws adhesive into the clearance between the shaft and the counterbore. As a result, adhesive may be introduced between the shaft and the counterbore irrespective of the size of the clearance. In particular, adhesive may be introduced into a relatively small clearance for which it would be difficult to deliver adhesive using alternative methods.

The adhesive may be introduced into the counterbore such that the adhesive creates a wet seal around the shaft. Consequently, as the shaft is inserted into the counterbore, air occlusion is avoided and a continuous layer of adhesive is formed between the shaft and the counterbore. A relatively strong adhesive bond is then formed between the shaft and the impeller.

An end of the counterbore may be chamfered. As the shaft is inserted into the counterbore, excess adhesive is then free to collect in the chamfered region. Consequently, a predetermined volume of adhesive may be introduced into the counterbore that ensures a relatively good coverage between the shaft and the counterbore without fear of the adhesive overfilling the counterbore and spilling onto other areas of the impeller. Furthermore, the chamfered portion provides a relatively large region over which the adhesive can be initially cured, e.g. by UV light.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
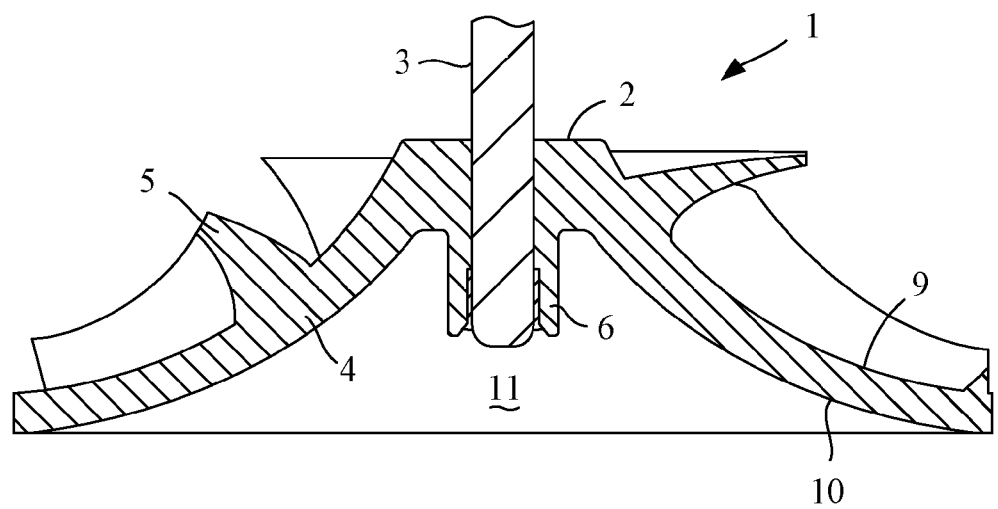
FIG. 1 is a sectional view of a rotor in accordance the present invention.
Figure 2:
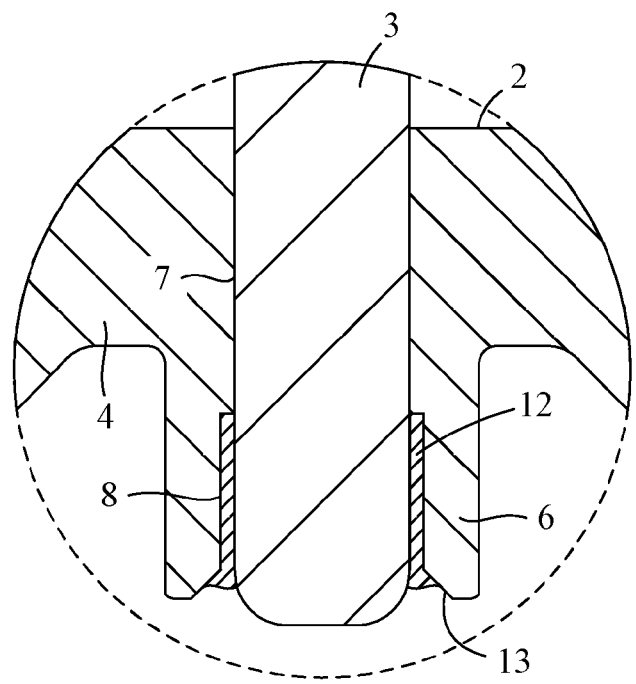
FIG. 2 is an exploded sectional view of the join between the shaft and the impeller of the rotor.

The rotor 1 of FIGS. 1 and 2 comprises an impeller 2 secured to a shaft 3.

The impeller 2 comprises a hub 4, a plurality of blades 5, a boss 6, a bore 7 and a counterbore 8.

The hub 4 has an aerodynamic upper surface 9 on which the blades 5 are provided, and a lower surface 10 that defines a recess 11 in the underside of the hub 4.

The boss 6 is cylindrical in shape and extends axially from the center of the hub 4. More specifically, the boss 6 extends downward from the lower surface 10 of the hub 4 and into the recess 11.

The bore 7 extends axially through the center of the hub 4 and into an upper part of the boss 6. The counterbore 8 extends axially through the lower part of the boss 6. The bore 7 and counterbore 8 thus provide an axial conduit through the impeller 2.

The shaft 3 is received within the bore 7 and the counterbore 8. The bore 7 and counterbore 8 are sized such that the shaft 3 forms an interference fit with the bore 7 and a clearance fit with the counterbore 8. The shaft 3 is secured to the counterbore 8 by an adhesive 12 located in the clearance between the shaft 3 and the counterbore 8.

The bore 7 is concentric with the outer diameter of the impeller 2. The interference fit between the shaft 3 and the bore 7 thus ensures that the impeller 2 and the shaft 3 are concentrically aligned. As a result, the rotor 1 is well balanced. Further fine tuning of the rotor balance may be achieved by adding or removing material from the impeller 2.

As the rotor 1 rotates, the impeller 2 is stressed radially, which causes the diameter of the bore 7 to expand. As the rotor speed increases, so too does the diameter of the bore 7. Consequently, the interference fit between the shaft 3 and the bore 7 is sensitive to rotor speed. The interference fit is also sensitive to rotor temperature. Owing to differences in the thermal expansivities of the shaft 3 and the impeller 2, changes in the temperature of the rotor 1 may bring about changes in the interference fit between the shaft 3 and the bore 7. The interference fit between the shaft 3 and the bore 7 is thus sensitive to rotor speed and rotor temperature.

The interference fit formed between the shaft 3 and the bore 7, when the rotor 1 is stationary and at ambient temperature, is of a magnitude that ensures that an interference fit exists under all operating conditions (e.g. speed and temperature) of the rotor 1. As a result, the impeller 2 is prevented from moving radially relative to the shaft 3 and thus the balance of the rotor 1 is maintained under all operating conditions.

Although an interference fit is maintained between the shaft 3 and the bore 7 under all operating conditions, the magnitude of the interference fit at the extremes of speed and/or temperature may be insufficient to transmit the required torque between the shaft 3 and the impeller 2. The adhesive join 12 between the shaft 3 and the counterbore 8 is of sufficient strength to transmit the required torque between the shaft 3 and the impeller 2.

Figure 3:
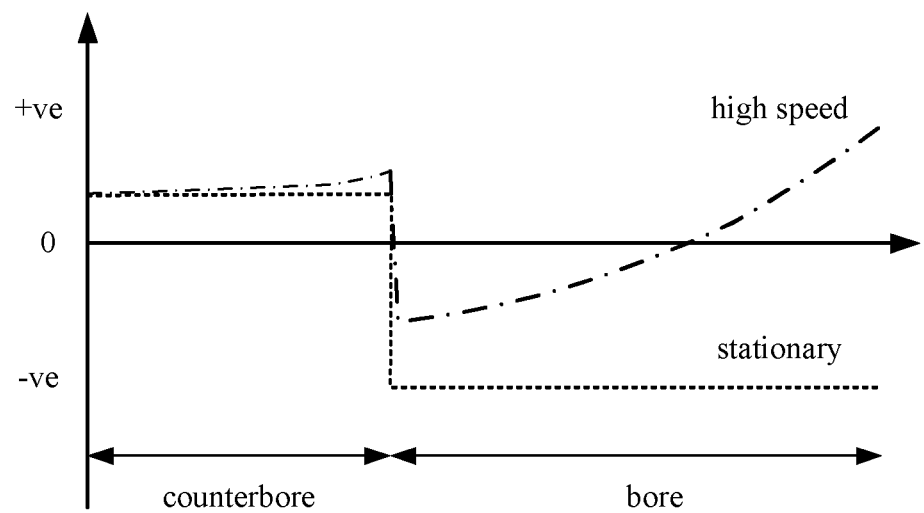
FIG. 3 illustrates the variance in fit between the shaft and the impeller when the rotor is stationary and when the rotor is rotating at high speed.

FIG. 3 illustrates the fit between the shaft 3 and the impeller 2 when the rotor 1 is stationary and when the rotor 1 is rotating at high speed. A positive value for the fit between the shaft 3 and the impeller 2 implies a clearance fit, while a negative value implies an interference fit.

The mass of the impeller 2 resides predominantly in the hub 4 and the blades 5. As a result, radial stress and expansion of the impeller 2 is greatest at the hub 4. In contrast, the boss 6 is relatively light and is therefore subject to much smaller radial stress and expansion. Expansion of the bore 7 is therefore greater than that of the counterbore 8.

Radial expansion of the bore 7 is not uniform but instead varies along the length of the bore 7. As can be seen from FIG. 3, the expansion of the bore 7 results in a clearance fit between the shaft 3 and one end of the bore 7. Nevertheless, an interference fit is maintained at the opposite end of the bore 7.

Radial expansion of the counterbore 8 is likewise non-uniform and varies along the length of the counterbore 8. The variation in the expansion of the counterbore 8 exerts a peel stress on the adhesive 12. Most adhesives have a relatively poor peel strength and will fail if exposed to excessive peel stress. By locating the counterbore 8 in the boss 6, the expansion of the counterbore 8 is relatively small. Consequently, the peel stress is relatively small and thus failure of the adhesive 12 is avoided.

The interference fit between the shaft 3 and the bore 7 ensures that the rotor 1 is balanced under all operating conditions. The adhesive join 12 between the shaft 3 and the counterbore 8 ensures that the required torque is transmitted between the shaft 3 and the impeller 2 under all operating conditions.

Rather than having a part interference fit and part adhesive join, one might conceivably have a single interference fit or a single adhesive join between the shaft 3 and the impeller 2. However, as will now be explained, both of these options have their failings.

Consider first the provision of a single interference fit. Let us assume that, rather than having a bore 7 and a counterbore 8, the impeller 2 comprises a single bore of uniform diameter that extends through the hub 4 and the boss 6. Let us further assume that the shaft 3 forms an interference fit with the bore and that the interference fit, when stationary, is sufficient to transmit the required torque between the shaft 3 and the impeller 2. As the rotor speed increases, radial stresses cause the diameter of the bore to expand. However, in contrast to the rotor 1 illustrated in FIG. 1, the bore now extends through the entire length of the boss 6. Since the mass of the boss 6 is relatively small, the radial stresses acting on the boss 6 are smaller than those at the hub 4. Accordingly, one might expect an interference fit sufficient for torque transmission to be maintained at the lower part of the boss 6. However, this is not the case. When the impeller 2 is pressed onto the shaft 3, the resulting interference imparts a circumferential stress to the bore. Since the boss 6 comprises a relatively thin wall, the boss 6 will simply yield if the interference fit is too great. Accordingly, it is not possible to achieve an interference fit along the boss 6 which is sufficient to transmit the required torque. The wall of the boss 6 may be made thicker such that a greater interference fit can be achieved. However, as the wall thickness increases, so too does the mass of the boss 6. As the mass of the boss 6 increases, the radial stresses acting on the boss 6 increase and thus the expansion of the bore increases. Accordingly, any effort to increase the interference fit by increasing the wall thickness will be hampered by a subsequent increase in the bore diameter during rotation.

Consider now the provision of a single adhesive join. Let us assume that, rather than having a bore 7 and a counterbore 8, a single bore of uniform diameter extends through the hub 4 and the boss 6. The shaft 3 forms a clearance fit with the bore and an adhesive is located in the clearance. Let us further assume that the adhesive provides sufficient shear strength to transmit the required torque between the shaft 3 and the impeller 2. In contrast to the rotor 1 illustrated in FIG. 1, the adhesive now extends between the shaft 3 and the hub 4. As a result, the adhesive is subject to a much greater tensile stress during operation of the rotor. This increase in tensile stress may be accommodated by providing a thicker adhesive join, which is better able to accommodate the tensile strain. However, the additional adhesive will increase the cost of the rotor. Additionally, when manufacturing the rotor, the adhesive may take longer to cure or may prove difficult to cure completely. Furthermore, the bulk properties of the adhesive will begin to play a role. In particular, the adhesive will have a greater propensity to creep, thereby increasing the likelihood of rotor imbalance. In addition to a greater tensile stress, the adhesive is subject to a greater peel stress. Expansion of the bore during operation of the rotor is non-uniform and thus exerts a peel stress on the adhesive. The variation in the expansion of the bore is much greater at the hub 4 than at the boss 6, e.g. FIG. 3. Accordingly, the peel stress acting on the adhesive is much greater at the hub 4 than at the boss 6. With the rotor 1 of FIG. 1, the adhesive 12 is located only at the boss 6, where the peel stress is relatively small. In contrast, the adhesive is now located at the hub 4, where the peel stress is relatively large. The adhesive is therefore likely to fail at the hub 4. Once initial failure of the adhesive has occurred, the failure is likely to propagate down the full length of the bore. The use of an adhesive to secure the shaft 3 to the impeller 2 is therefore unsuitable for rotors where relatively high radial stresses are likely, e.g. when employing a large impeller or when operating at relatively high speeds. Also, by employing only an adhesive join, subsequent rotor imbalance due to adhesive creep is likely, particularly if the rotor is required to operate at elevated temperatures.

By employing a part interference fit and part adhesive join to secure the impeller 2 to the shaft 3, the balance of the rotor 1 is maintained under all operating conditions, as is torque transmission between the impeller 2 and the shaft 3. Since the primary function of the interference fit is to maintain alignment between the impeller 2 and the shaft 3, it is not essential for the interference fit to provide the torque transmission between the impeller 2 and the shaft 3. Accordingly, an interference fit may be employed that does not require an excessive press force and does not exceed the yield point of the impeller 2. Moreover, by locating the counterbore 8 in the boss 6, failure of the adhesive 12 due to excessive peel stress may be avoided.

The impeller 2 illustrated in FIG. 1 is a centrifugal impeller. However, other types of impeller might equally be employed according to the intended application of the rotor 1. The impeller 2 is formed of plastic, although other materials might equally be used. Plastic has the advantages of weight and cost over a metal equivalent. Being formed of plastic, the yield point of the impeller 2 may be relatively low. Nevertheless, by employing a part interference fit and a part adhesive join, torque transmission between the impeller 2 and the shaft 3 may be achieved without the need for an interference fit that would otherwise exceed the yield point of the impeller 2.

The underside of the hub 4 is recessed primarily to reduce the mass of the impeller 2. This then has the advantage of reducing radial stresses and thus bore expansion. However, a further advantage is that the impeller 2 is axially compact. This arises from the fact that the boss 6 extends into the recess 11 and is thus bound within the profile of the hub 4. In spite of these advantages, the hub 4 is less well constrained. In particular, the outer perimeter of the hub 4 may flex upwards during rotation. Accordingly, rather than being recessed, the underside of the hub 4 may be flat or may include bracing struts that extend radially from the outer diameter to the inner diameter of the hub 4.

Although the boss 6 of the impeller 2 of FIGS. 1 and 2 extends below the hub 4, the boss 6 might equally extend above the hub 4.

Figure 4:
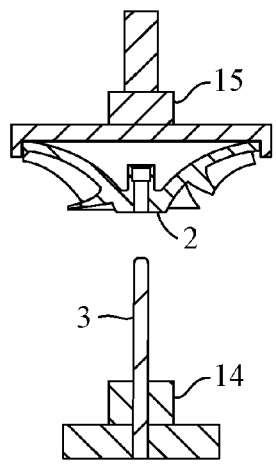
FIG. 4 illustrates a method of manufacturing the rotor.
Figure 4:
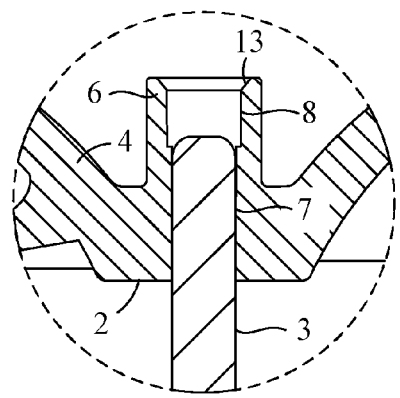
Figure 4:
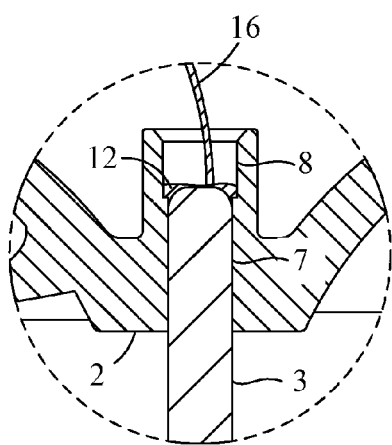
Figure 4:
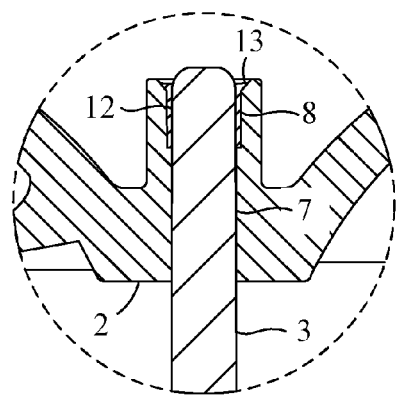

A method of manufacturing the rotor 1 will now be described with reference to FIG. 4.

The impeller 2 is first molded from plastic. Owing to the tolerances associated with most molding processes, it is generally not possible to mold the bore 7 with sufficiently tight tolerances to achieve the required interference fit. Accordingly, following molding, the bore 7 is drilled or otherwise machined in the impeller 2. The counterbore 8 is then machined in the same way. The tolerances in the counterbore 8 are not as critical as those of the bore 7. Accordingly, the counterbore 8 might alternatively be formed during the molding process.

The diameter of the bore 7 is chosen so as to achieve a desired interference fit with the shaft 3. The diameter of the counterbore 8, on the other hand, is chosen such that a clearance fit is formed with the shaft 3. Moreover, the diameter of the counterbore 8 is chosen such that the adhesive 12, which is subsequently introduced into the clearance, is sufficiently thick to accommodate the tensile strain that arises during operation of the rotor 1.

After molding and machining the impeller 2, the counterbore 8 is subject to plasma treatment. This increases the surface polarity and thus the wettability of the counterbore 8.

The shaft 3 is then mounted into a bottom tool 14 of a press, and the impeller 2 is mounted into a top tool 15 of the press, e.g. FIG. 4(a). The two tools 14,15 are arranged such that the shaft 3 is concentrically aligned with the bore 7 in the impeller 2.

The press then makes a first downward press onto the top tool 15, causing the shaft 3 to be inserted into the bore 7 of the impeller 2, e.g. FIG. 4(b). The press is then retracted and an adhesive 12 is introduced into the counterbore 8, e.g. FIG. 4(c). The adhesive 12 is introduced using a dispensing tube 16, which delivers a predetermined volume of adhesive 12 to the bottom of the counterbore 8. The dispensing tube 16 may be fed through an aperture in the top tool 15. Alternatively, the top tool 15 may be temporarily lifted from the impeller 2.

The press then makes a second downward press onto the top tool 15, causing the shaft 3 to be inserted into the counterbore 8, e.g. FIG. 4(d). The adhesive 12 forms a wet seal around the end of the shaft 3 between the shaft 3 and the counterbore 8. The interference fit between the shaft 3 and the bore 7 forms an air-tight seal. Consequently, as the impeller 2 is pressed onto the shaft 3, the adhesive 12 is drawn into the clearance created between the shaft 3 and the counterbore 8. The adhesive 12 maintains a wet seal around the shaft 3 as the impeller 2 is pressed onto the shaft 3. The net result is a relatively thin continuous layer of adhesive 12 between the shaft 3 and the counterbore 8.

The impeller 2 continues to be pressed onto the shaft 3 until the end of the shaft 3 is approximately coincident with the end of the boss 6. If the impeller 2 were pressed further onto the shaft 3, there is a possibility that the shaft 3 will pull adhesive 12 out of the clearance between the shaft 3 and the counterbore 8. The end of the counterbore 8 is countersunk or otherwise chamfered. Excess adhesive 12, which was not drawn into the clearance between the shaft 3 and the counterbore 8, then collects in the countersink 13. Once the impeller 2 has been pressed fully onto the shaft 3, the press is retracted and the adhesive 12 is cured.

When inserting the shaft 3 into the counterbore 8, the adhesive 12 must maintain a wet seal around the shaft 3 if a continuous layer of adhesive 12 is to be achieved. If a wet seal is not maintained, air rather than adhesive 12 will be drawn into the clearance between the shaft 3 and the counterbore 8. As a result, the adhesive layer 12 will have air gaps that will weaken the strength of the adhesive join 12 between the shaft 3 and the counterbore 8. The adhesive 12 introduced into the counterbore 8 is therefore of sufficient volume to ensure that a wet seal is maintained while the impeller 2 is pressed onto the shaft 3. On the other hand, if too much adhesive 12 is introduced into the counterbore 8, the countersink 13 will not be able to retain the excess adhesive 12.

Accordingly, a predetermined volume of adhesive 12 is introduced into the counterbore 8. The predetermined volume takes into account the various tolerances so as to ensure that a wet adhesive seal is maintained around the shaft 3 and that excess adhesive 12 is retained in the countersink 13.

If the adhesive 12 were introduced at the very top of the counterbore 8, it is possible that part of the adhesive 12 might stick to the surface of the counterbore 8 as it runs down to the bottom. This would then reduce the volume of adhesive 12 around the end of the shaft 3. Additionally, the adhesive 12 might collect on one side only of the shaft 3. In both instances, a wet seal between the shaft 3 and the counterbore 8 might not be maintained as the impeller 2 is pressed onto the shaft 3. By employing a dispensing tube 16, adhesive 12 may be delivered to the bottom of the counterbore 8 and distributed evenly around the shaft 3. In order to encourage adhesive 12 to run off the end of the shaft 3 as the shaft 3 is inserted into the impeller 2, the end of the shaft 3 is rounded or tapered.

If the speed at which the shaft 3 is inserted into the counterbore 8 is too fast, the adhesive 12 drawn into the clearance may cavitate. The speed of insertion is therefore controlled so as to avoid cavitation. The particular speed at which cavitation occurs will depend primarily on the viscosity of the adhesive 12. Accordingly, when an adhesive of higher viscosity is employed, a slower speed of insertion is employed.

With the method described above, a continuous layer of adhesive 12 is formed between the shaft 3 and the counterbore 8. Accordingly, a strong adhesive bond is formed between the shaft 3 and the impeller 2, which is capable of transmitting the required torque. By first forming an interference fit between the shaft 3 and the bore 7, adhesive 12 is actively drawn into the clearance between the shaft 3 and the counterbore 8 as the shaft 3 is inserted into the counterbore 8. As a result, a continuous layer of adhesive 12 may be formed irrespective of the size of the clearance between the shaft 3 and the counterbore 8. In particular, adhesive 12 may be introduced into a relatively small clearance for which it would be difficult to deliver adhesive using conventional methods, e.g. injection.

The invention claimed is:

1. A rotor comprising an impeller secured to a shaft, wherein the impeller comprises a bore, a counterbore, a hub, a plurality of blades provided on the hub, and a boss that is cylindrical in shape and extends axially below from the hub, the bore is formed in the hub, the counterbore is formed in the boss, the bore extends axially through the hub and a part of the boss, and that the counterbore extends through another part of the boss, the shaft forms an interference fit with the bore, and the shaft is adhered to the counterbore, wherein when the rotor rotates, a radial stress at the bore in the hub is greater than a radial stress at the counterbore in the boss.

2. The rotor of claim 1, wherein the hub comprises a recess into which the boss extends.

3. The rotor of claim 1, wherein the hub comprises an upper surface on which the blades are provided, and a lower surface that is shaped so as to define the recess.

4. The rotor of claim 1, wherein the impeller is formed of plastic.

5. The rotor of claim 1, wherein an end of the counterbore is chamfered, and the shaft is inserted into the counterbore such that adhesive collects in the chamfer.

6. A rotor comprising an impeller secured to a shaft, the impeller comprising a hub, a plurality of blades provided on the hub, and a boss that extends axially from the hub, wherein the hub comprises a bore, the boss comprises a counterbore, the bore extends axially through the hub and a part of the boss, and that the counterbore extends through another part of the boss, the shaft forms an interference fit with the bore, the shaft forms a clearance fit with the counterbore, and an adhesive is located in the clearance between the shaft and the counterbore, wherein when the rotor rotates, a radial stress at the bore in the hub is greater than a radial stress at the counterbore in the boss.

7. A rotor comprising an impeller secured to a shaft, wherein the impeller comprises a bore, a counterbore, a hub, a plurality of blades provided on the hub, and a boss that extends axially from the hub, the bore is formed in the hub, the counterbore is formed in the boss, the bore extends axially through the hub and a part of the boss, and that the counterbore extends through another part of the boss, the shaft forms an interference fit with the bore, and the shaft is adhered to the counterbore, wherein the hub comprises a recess into which the boss extends.

8. The rotor of claim 7, wherein the hub comprises an upper surface on which the blades are provided, and a lower surface that is shaped so as to define the recess.

9. The rotor of claim 7, wherein the impeller is formed of plastic.

10. The rotor of claim 7, wherein an end of the counterbore is chamfered, and the shaft is inserted into the counterbore such that adhesive collects in the chamfer.

11. A method of manufacturing a rotor, the method comprising:
   providing an impeller having a bore and a counterbore wherein the bore extends axially through a hub and a part of a boss, and the counterbore extends through another part of the boss;
   inserting a shaft into the bore, the shaft forming an interference fit with the bore;
   after the shaft is inserted into the bore and before the shaft is inserted into the counterbore, introducing an adhesive into the counterbore;
   inserting the shaft into the counterbore such that adhesive is drawn into a clearance formed between the shaft and the counterbore; and
   curing the adhesive.

12. The method of claim 11, wherein the adhesive is introduced into the counterbore such that the adhesive creates a wet seal around the shaft.

13. The method of claim 11 or 12, wherein an end of the counterbore is chamfered, and the shaft is inserted into the counterbore such that adhesive collects in the chamfer.

* * * * *